United States Patent
Aguirre et al.

(10) Patent No.: US 7,915,342 B2
(45) Date of Patent: Mar. 29, 2011

(54) BREATHABLE FILMS

(75) Inventors: Juan J. Aguirre, League City, TX (US);
Mark B. Miller, Houston, TX (US);
David L. Turner, Pasadena, TX (US)

(73) Assignee: Fina Techology, Inc., Houston, TX (US)

( * ) Notice: Subject to any disclaimer, the term of this patent is extended or adjusted under 35 U.S.C. 154(b) by 875 days.

(21) Appl. No.: 11/288,631

(22) Filed: Nov. 28, 2005

(65) Prior Publication Data

US 2007/0123650 A1    May 31, 2007

(51) Int. Cl.
*C08L 53/02* (2006.01)
*C08L 19/00* (2006.01)

(52) U.S. Cl. ........... 525/88; 525/98; 525/99; 525/240

(58) Field of Classification Search .......... 525/88, 525/98, 99, 240
See application file for complete search history.

(56) References Cited

U.S. PATENT DOCUMENTS

| | | | |
|---|---|---|---|
| 4,107,413 A | 8/1978 | Giannini et al. | |
| 4,114,319 A | 9/1978 | Governale | |
| 4,220,554 A | 9/1980 | Scatá et al. | |
| 4,294,721 A | 10/1981 | Cecchin et al. | |
| 4,354,004 A | 10/1982 | Hughes et al. | |
| 4,439,540 A | 3/1984 | Cecchin et al. | |
| 4,460,701 A | 7/1984 | Terano et al. | |
| 4,562,173 A | 12/1985 | Terano et al. | |
| 5,066,738 A | 11/1991 | Ewen | |
| 5,412,020 A * | 5/1995 | Yamamoto et al. | 524/505 |
| 5,641,848 A | 6/1997 | Giacobbe et al. | |
| 6,211,295 B1 | 4/2001 | Burgin et al. | |
| 6,255,425 B1 | 7/2001 | Asanuma et al. | |
| 6,316,068 B1 * | 11/2001 | Masubuchi et al. | 428/35.7 |
| 6,696,520 B1 * | 2/2004 | Pellegatti et al. | 525/88 |
| 6,995,213 B2 * | 2/2006 | Miller et al. | 525/240 |
| 2002/0006482 A1 | 1/2002 | Falla et al. | |
| 2003/0017299 A1 * | 1/2003 | Matsui et al. | 428/98 |
| 2003/0033707 A1 * | 2/2003 | Abplanalp et al. | 29/510 |
| 2007/0021567 A1 * | 1/2007 | Van Dun et al. | 525/240 |
| 2007/0284787 A1 * | 12/2007 | Weng et al. | 264/500 |

FOREIGN PATENT DOCUMENTS

| | | |
|---|---|---|
| EP | 0 414 202 A2 | 2/1991 |
| EP | 0 414 202 B1 | 2/1991 |
| EP | 0 474 376 A2 | 3/1992 |
| EP | 0 474 376 A3 | 3/1992 |
| EP | 0 474 376 B1 | 3/1992 |
| EP | 0 595 252 A1 | 5/1994 |
| WO | WO 97/20888 | 6/1997 |
| WO | WO 97/44178 | 11/1997 |

OTHER PUBLICATIONS

"Finaclear® 520 Technical Data Sheet," Styrene Butadiene Copolymer (SBC), Total Petrochemicals, Oct. 2004, pp. 1-2.
"Finaclear® 602D Technical Data Sheet," Styrene Butadiene Copolymer (SBC), Total Petrochemicals, Oct. 2004, pp. 1-2.
"Protec® Copolymer Polypropylene (CPP)," http://www.cpg-vycom.com/protec_cp.asp, Compression Polymers Corp. and Vycom Corp., 2005, 1 pg.

* cited by examiner

*Primary Examiner* — Jeffrey C Mullis
(74) *Attorney, Agent, or Firm* — Tenley R. Krueger; Diane L. Kilpatrick-Lee

(57) ABSTRACT

A polymeric composition having a MFR of less than 2 g/10 min. which when formed into a film has an oxygen transmission rate of equal to or greater than 300 cc/100 in$^2$/24 h at 73° F. and 0% relative humidity per ASTM D 3895 and a water vapor transmission rate of equal to or greater than 0.5 g/100 in$^2$/24 hrs at 100° F. and 100% relative humidity per ASTM F 1249. A polymeric film having a 2% secant modulus in the machine direction of 300 MPa to 700 MPa; an oxygen transmission rate of greater than 300 cc/100 in$^2$/24 h at 100° F., a water vapor transmission rate of greater than 0.5 g/100 in$^2$/24 hrs at 100° F. and 100% relative humidity; an Elmendorf tear strength in the MD of from 50 g to 400 g; an Elmendorf tear strength in the transverse direction of from 150 g to 400 g, a dart drop strength of from 200 g to about 500 g, a haze of from 0% to 85% and, gloss at 45° of from 5% to 70%.

20 Claims, No Drawings

BREATHABLE FILMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to polymeric compositions and films made from same. More specifically, this invention relates to the field of film products for fresh food packaging.

2. Background of the Invention

Synthetic polymeric materials, particularly polypropylene resins, are widely used in the manufacturing of a variety of end-use articles ranging from medical devices to food containers. Commercial grade polypropylenes are typically produced using either a Ziegler-Natta or metallocene catalyst mechanism in a polymerization process. Many industries, such as the packaging industry, utilize these polypropylene materials in various manufacturing processes to create a variety of finished goods.

Within the packaging industry, there are a number of unique applications that ideally require strong and substantially clear polymers. One such application is the manufacture of containers for the packaging of perishable food products. Fresh-cut foods, such as produce, respire or maintain an influx of oxygen and an efflux of carbon dioxide. Different types of fresh foods respire at different rates thus requiring different oxygen levels to maintain "freshness" or slow the aging process. Recent designs for packaging containers have attempted to modify the respiration rate of a food product by controlling the atmosphere within the packaging container. The atmosphere within the packaging container is determined by barrier properties of the container material such as permeability. Barrier properties refer to the permeability of the container material to gases and liquids such as oxygen and water. Such modified atmosphere packaging (MAP) containers have to strike a balance between the rates of gas and liquid exchange necessary to maintain food freshness with that necessary to minimize detrimental processes such as microbial growth. From a commercial vantage point, it is often necessary to also balance the mechanical properties of the polymeric material used to construct the MAP with the need for functionality and high quality aesthetics that are appealing to the consumer.

Given the foregoing discussion, it would be desirable to develop a polymeric material for food packaging applications having improved barrier properties. It would also be desirable to develop a polymeric material for food packaging applications having improved mechanical and optical properties.

BRIEF SUMMARY OF SOME OF THE PREFERRED EMBODIMENTS

Disclosed herein is a polymeric composition having a MFR of less than 2 g/10 min. which when formed into a film has an oxygen transmission rate of equal to or greater than 300 cc/100 in$^2$/24 h at 73° F. and 0% relative humidity per ASTM D 3895 and a water vapor transmission rate of equal to or greater than 0.5 g/100 in$^2$/24 hrs at 100° F. and 100% relative humidity per ASTM F 1249.

Further disclosed herein is a polymeric film having a 2% secant modulus in the machine direction of 300 MPa to 700 MPa; an oxygen transmission rate of greater than 300 cc/100 in$^2$/24 h at 100° F., a water vapor transmission rate of greater than 0.5/100 in$^2$/24 hrs at 100° F. and 100% relative humidity; an Elmendorf tear strength in the MD of from 50 g to 400 g; an Elmendorf tear strength in the transverse direction of from 150 g to 400 g, a dart drop strength of from 200 g to about 500 g, a haze of from 0% to 85% and, gloss at 45° of from 5% to 70%.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

A polymeric composition includes at least one polymer and may also include a modifier. In an embodiment, the polymer may include an impact copolymer, for example a polypropylene impact copolymer. Polypropylene impact copolymers (ICP) are also known as heterophasic copolymers wherein a polypropylene homopolymer phase or component is joined to a copolymer phase or component. The ICP may comprise from 10 wt. % to 20 wt. %, ethylene, alternatively from 10 wt. % to 15 wt. % ethylene, based on the total weight of the ICP.

The homopolymer phase of an ICP may be a propylene homopolymer, provided however that the homopolymer phase may contain up to 5% by weight of another alpha-olefin, including but not limited to $C_2$-$C_8$ alpha-olefins such as ethylene and 1-butene. Despite the potential presence of small amounts of other alpha-olefins, this component of the ICP is generally referred to as a polypropylene homopolymer.

The copolymer phase of an ICP may be a random copolymer of propylene and ethylene, also referred to as an ethylene/propylene rubber (EPR). Without wishing to be limited by theory, it is thought by some that the EPR portion of the ICP has rubbery characteristics which, when incorporated within the matrix of the homopolymer component, may function to provide increased impact strength to the ICP. Small amounts of other polymerizable monomers may be included with the propylene and ethylene so as to impart desired physical properties.

In an embodiment, the ICP may have a melt flow rate of less than 4.0 g/10 min., alternatively of less than 2.0 g/10 min., alternatively of less than 1.0 g/10 min. Example of suitable ICPs include without limitation the polypropylene impact copolymers sold as 4180 or 4170 by Total Petrochemicals USA, Inc. In an embodiment, the ICP generally has the physical properties set forth in Table I.

TABLE I

| Resin Properties[1] | Typical Values | ASTM Method |
|---|---|---|
| Melt flow, g/10 min. | 0.7 | D 1238 |
| Density, g/cm$^3$ | 0.905 | D 1505 |
| Melting point, ° C. | 160-165 | TOTAL Polypropylene Method |
| Mechanical Properties | | |
| Tensile strength at yield, psi | 3000-5000 | D 638 |
| Elongation at yield, % | 9-12 | D 638 |
| Flexural modulus, psi | 150,000-210,000 | D 790 |
| Izod impact (notched) | | |
| @ 23° C. ft. lb/in (J/m) | No Break (No Break) | D 256 |
| @ −20° C. ft. lb/in | 1.0-2.0 | D 256 |
| Charpy impact strength | | |
| @ 23° C. kJ/m$^2$ | No Break | DIN 53453 |
| @ −20° C. kJ/m$^2$ | 10 | DIN 43453 |
| Thermal Properties | | |
| Vicat softening point, ° C. | 145-155 | D 1525 |
| Heat deflection, ° C. | 88-92 | D 648 |

[1]The values given are based on a film made by an injection molding process

Polymer resins comprising an ICP may be formed by a sequential polymerization process. The polymerization reaction may be carried out in a plurality-reactor configuration, for example a two-reactor configuration. In a two-reactor configuration the catalyst, for example a Ziegler-Natta catalyst and propylene are charged into a first reactor. Within the reactor, the propylene homopolymer is produced on the surface of the catalyst particles. The propylene polymer-coated catalyst grains are then transferred to one or more secondary reactors, such as for example one or more gas-phase reactors, where the copolymer is produced by the copolymerization of the propylene and the ethylene in the presence of a catalyst. The copolymer, which has rubbery characteristics and provides impact resistance, may be incorporated within the matrix of the homopolymer component, which provides overall stiffness. Examples of suitable reactors include without limitation loop reactors, stirred tank reactors, gas-phase reactors and combinations thereof. Standard equipment and procedures for polymerizing propylene and another alpha olefin such as ethylene into an impact copolymer are known to one skilled in the art. Examples of catalysts suitable for preparation of the ICP are disclosed in U.S. Pat. Nos. 4,107,413; 4,294,721; 4,439,540; 4,114,319; 4,220,554; 4,460,701; 4,562,173; and 5,066,738, each of which is incorporated in its entirety by reference herein.

The polymeric composition may comprise a modifier such as a softening agent in amounts ranging iteratively of from 5% to 50% by weight, alternatively from 5 wt. % to 25 wt. %, alternatively from 10 wt. % to 15 wt. %. A softening agent may be added to the polymeric composition to impart desired mechanical properties such as softness and/or improve barrier properties such as permeability to water or oxygen. In an embodiment, the softening agent is a rubber, a thermoplastic elastomer or combinations thereof. Examples of rubbers include the diene polymers polyisoprene and polybutadiene or the vinyl polymer polyisobutylene. Examples of thermoplastic elastomers include polyurethanes, polyester copolymers, olefinics and styrene copolymers.

In an embodiment, the softening agent is a styrene copolymer, alternatively a styrene -butadiene block copolymer (SBS), alternatively a high styrenic content SBS. Herein a high styrenic content SBS refers to an SBS having a styrene content of equal to or greater than 70 wt. %. SBS are also termed thermoplastic elastomers. The SBS may be produced by any method known for the production of SBS, for example anionic polymerization. Representative examples of suitable SBS include without limitation the high styrenic content SBS products sold as FINAPRENE 602D or FINACLEAR 520 by Total Petrochemicals USA, Inc. In an embodiment, the SBS (e.g., FINACLEAR 520) has generally the physical properties set forth in Table II.

TABLE II

| Property | ASTM | ISO | Unit | Typical Value |
|---|---|---|---|---|
| Physical Properties | | | | |
| Polymer type | | | | SBS |
| Structure | | | | Linear |
| Physical appearance | | | | pellets |
| Density at 23° C. | D 792-A | | g/cm$^3$ | 1.01 |
| Bulk density | D 1895-B | | g/cm$^3$ | 0.64 |
| Rheological and Thermal Properties | | | | |
| Melt flow index (200° C./5 kg) | D 1238 G | 1133 | g/10 min | 7.5 |
| Vicat temperature A | D 1525 | 306 | ° C. | 73 |
| Vicat temperature B | D 1525 | 306 | ° C. | 45 |
| Optical Properties | | | | |
| Transmittance | D 1003 | | % | 90 |
| Haze (2 mm) | D 1003 | | % | 3.5 |
| Mechanical Properties | | | | |
| Flexural modulus | | 178 | MPa | 1000 |
| Flexural modulus | D790 | | MPa | 930 |
| Tensile modulus | D 638 | 527 | MPa | 1130 |
| Tensile strength at yield | D 638 | 527 | MPa | 24 |
| Elongation at break | D 638 | 527 | % | >400 |
| Unnotched Izod impact at 23° C. | | 180 | J/m | |
| Unnotched Izod impact at 23° C. | D 256 | | J/m | 1000, no break |
| Shore hardness (inst.) | | 868 | shore D | 64 |

The SBS copolymer may be included in the polymeric composition by any method suitable for the incorporation of a modifier into a polymeric composition. Such methods are known to one skilled in the art. For example, the SBS may be blended into the polymeric composition and extruded to form pellets. Examples of suitable blending techniques include without limitation, solution blending, solid state physical admixture, extrusion admixture, roll milling, screw extrusion, and the like. In one embodiment, the blends are made using conventional extruders associated with blown film or cast film production lines.

In an embodiment, the polymeric composition may also contain additives as deemed necessary to impart desired physical properties, such as printability, increased gloss or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or the like with other components. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions are known to one skilled in the art.

The polymeric compositions of this disclosure may be converted to an end-use article by any suitable method. In an embodiment, this conversion is a plastics shaping process such as those described in this disclosure. Examples of end use articles into which the polymeric composition may be formed include pipes, films, bottles, fibers, containers, cups, lids, plates, trays, car parts, blister packs, and so forth. Additional end use articles would be apparent to those skilled in the art.

In an embodiment, the end-use article is a film, which may be further formed into a packaging container for a consumer product such as fresh cut foods. The films of this disclosure may be produced by any method and under any conditions known to one skilled in the art for the production of films. In an embodiment, the polymeric compositions are formed into films by the process of blown film extrusion.

Blown films are formed through a process whereby a polymeric composition is extruded through a conic spiral mandrel die to form a tube. The tube is then inflated into a balloon by the introduction of air via a hole in the center of the spiral mandrel die. A high-speed air ring mounted at the top of the die is used to cool the hot film. The balloon of film may continue to expand upward, with continuous cooling until it is flattened by passing through nip rolls. The now collapsed tube may then be further processed by passing through rollers that can stretch the film in one direction. Alternatively, the film may be passed through rollers designed to stretch the film in differing axial directions to produce biaxially oriented films.

Process parameters for blown film extrusion of the polymeric composition of this disclosure may include a blow up ratio of greater than 4, alternatively greater than 2.5 and, alternatively greater than 2 where the blow-up ratio refers to the ratio between the diameter of the inflated balloon of film and the gauge of the collapsed film, in other words it is a measure of the extent of inflation of the film. Additional process parameters may include a draw down ratio of less than 15, alternatively less than 10 and, alternatively less than 7, where the draw down ratio refers to the relationship between the die gap and the film gauge. In an embodiment, the process parameters include a die temperature of greater than 440° F. and an extruder temperature of greater than 440° F. For example, a process for the production blown films uses the Alpine system available from Hosokawa. In an embodiment, production of blown films is carried out at generally the conditions given in Table III.

TABLE III

| Parameter | Description |
| --- | --- |
| Extruder | 55 mm diameter, groove feed |
| Extruder speed | 75 rpm |
| Extruder temperature Profile | |
| | Zone 1: 170° F. |
| | Zone 2: 445° F. |
| | Zone 3: 445° F. |
| Melt temperature | 475° F. |
| Die temperature profile | |
| | Die 1: 445° F. |
| | Die 2: 445° F. |
| | Die 3: 445° F. |
| Die diameter | 118 mm |
| Die cap | 0.9 mm |

TABLE III-continued

| Parameter | Description |
| --- | --- |
| Blow up ratio (BUR) | 2.5 |
| Neck height | 0 inch |

In an embodiment, the blown film may have a monolayer thickness from 0.5 mils to 2.5 mils. Such films may be used as a monolayer film product or may be co-extruded with other resins to form multilayer films. Films of this disclosure may display improvements in mechanical properties such as softness, optical properties such as reduced haze and an appearance having a reduced amount of wrinkles.

Desirably, the polymeric composition when formed into a film may have a 2% secant modulus in the machine direction (MD) of from 300 MPa to 700 MPa; an oxygen transmission rate (OTR) of greater than 300 cc/100 in$^2$/24 h at 100° F., a water vapor transmission rate (WVTR) of greater than 0.5 g/100 in$^2$/24 hrs at 100° F. and 100% relative humidity; an Elmendorf tear strength in the MD of from 50 g to 400 g; an Elmendorf tear strength in the transverse direction (TD) of from 150 g to 400 g, a dart drop strength of from 200 g to 500 g, haze of from 10% to 85%, gloss at 45° of from 5% to 70% and a reduced wrinklability, as further described below.

The films of this disclosure may have an increased breathability as indicated by an increased OTR. OTR may be measured by exposing one side of a film to an oxygen atmosphere. As the oxygen solubilizes into the film and permeates through the material, nitrogen sweeps the opposite side of the film and transports the transmitted oxygen molecules to a coulometric sensor. This value is reported as a transmission rate. When this rate is multiplied by the average thickness of the material, the results are considered a permeability rate. In an embodiment, the films of this disclosure have oxygen transmission rates of greater than 300 cc/100 in$^2$/24 h at 100° F. as determined in accordance with ASTM D 3895.

The films of this disclosure may have an increased softness as indicated by a reduced 2% secant modulus. The secant modulus is a measure of the stress to strain response of a material or the ability to withstand deformation under an applied force. In an embodiment, the films of this disclosure have a 2% secant modulus in the MD of from 300 MPa to 700 MPa, alternatively from 400 MPa to 600 MPa as determined in accordance with ASTM D 882.

The films of this disclosure may have an appearance that is less wrinkled than films of similar composition lacking a softening additive such as those disclosed herein. During the production of blown film, as described herein, the polymeric composition is eventually formed into a balloon that is under continuous cooling until it is collapsed or flattened by rollers. This may be envisioned as conversion of the polymeric composition from a three-dimensional structure (i.e. a balloon) to a two-dimensional structure (i.e. a sheet of film). This conversion process may lead to the formation of distortions in the film such as wrinkles and creases. Without wishing to be limited by theory, the polymeric compositions of this disclosure may be more pliable and thus undergo this conversion with a minimal amount of distortion of the film surface thus producing a film with a reduced amount of wrinkles and creases. In an optional embodiment, the films of this disclosure may contain an additional modifier to reduce the distortions acquired when the blown film is collapsed. Such modifiers may include effective amounts of slip agents, antiblock agents or combinations thereof. In an embodiment, the slip and/or antiblock agent is a fatty acid amide, alternatively erucamide, alternatively behenamide, alternatively a combination of erucamide and behenamide. Methods for inclusion and effective amounts of these slip and antiblock agents are known to one of ordinary skill in the art.

The films of this disclosure may display increased impact strength as indicated by an increased dart drop strength and/or increased tear strength. The tear strength, also called the Elmendorf tear strength, is the force required to tear, by propagation, a notched film sample in either the MD or the TD. The test is done with an instrument termed a tear tester that has a stationary clamp and a movable clamp on a pendulum. Samples are clamped into the tester and notched to start the tear; then the pendulum clamp is released. This tears the sample and the scale registers the arc through which the released pendulum swings. As the arc is proportional to the tear strength of the sample, calibration of the arc gives the tear strength. The dart drop strength is a measure of the dynamic strength of a material. Specifically, a weighted dart is dropped from a standard height onto a taut sample. The dart unit is the weight of dart in grams that breaks the sample 50% of the time. In an embodiment, the films of this disclosure have an Elmendorf tear strength in the MD of from 50 g to 400 g, alternatively from 150 g to 350 g and an Elmendorf tear strength in the TD of from 150 g to 400 g, alternatively from 250 g to 350 g as determined in accordance with ASTM D 1922. In an embodiment, the films of this disclosure have a dart drop strength of from 200 g to 500 g, alternatively from 300 g to 400 g as determined in accordance with ASTM D 1709.

The films of this disclosure may also display improved optical properties such as reduced haze and increased gloss. Haze indicates the degree to which a film has reduced clarity or cloudiness while gloss is a measurement of the relative luster or shininess of a film surface In an embodiment, the films of this disclosure have a haze of from 10% to 85%, alternatively from 12% to 75% as determined in accordance with ASTM D 1003 and a gloss at 45° of from 5% to 70%, alternatively from about 9% to about 60% as determined in accordance with ASTM D 523.

Additionally, films of this disclosure may have a WVTR of greater than 0.5 g/100 in$^2$/24 hrs at 100° F. and 100% relative humidity. The rate at which water vapor permeates the film is determined in accordance with ASTM F 1249.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Using an Alpine blown film line, monolayer films were produced at 0" neck height, 75 rpm, and 2.5 blow-up ratio. Film thickness was 50 µm (2 mils). All polymeric compositions used 4180 as the base polypropylene resin. Two polymeric compositions were prepared having either FINAPRENE 602D or FINACLEAR 520 as the softening agent. These modifiers were incorporated into the base resin by dry blending the indicated amount. For comparative purposes, a polymeric composition of the base resin with another impact copolymer was also examined. In this experiment, 4180 was blended with 5724, a 20 melt flow rate, high impact copolymer with high ethylene content (11.5%) commercially available from Total Petrochemicals USA, Inc. The mechanical and optical properties of the films produced were determined in accordance with the ASTM methods referenced previously. Results of these experiments are given in Table IV. In parentheses below each polymeric composition is given the weight percentage of the base resin followed by the weight percentage of the modifier.

TABLE IV

| Properties | 4180 (100%) | 4180/FINAPRENE 602D (85%/15%) | 4180/FINACLEAR 520 (85%/15%) | 4180/5724 ICP (85%/15%) |
| --- | --- | --- | --- | --- |
| Haze, % | 78 | 68 | 74 | 74 |
| Gloss @45° | 7 | 9 | 9 | 8 |
| Tensile strength @ yield, MPa, MD, (TD) | 30 (20) | 20 (18) | 23 (20) | 25 (20) |
| Tensile strength @ break, MPa MD, (TD) | 60 (50) | 50 (40) | 50 (40) | 50 (35) |
| Elongation @ break, % MD, (TD) | 800 (900) | 700 (820) | 670 (730) | 770 (800) |
| 2% Secant modulus, MPa MD, (TD) | 700 (690) | 440 (300) | 540 (370) | 620 (500) |
| Dart drop, gr | 320 | 360 | 360 | 360 |
| Tear strength, gr MD (TD) | 175 (290) | 150 (370) | 290 (270) | 90 (200) |
| Puncture force @ break, lb$_f$ | 5.2 | 5.2 | 5.4 | 5.4 |
| Stress-whitening observed | Yes | Some | Some | Yes |
| Barrier, film | | | | |
| WVTR, g/100 in$^2$/24 hrs @ 100° F., 100% relative humidity (RH) | 0.45 | 0.53 | 0.54 | NA |
| O2TR, cc/100 in$^2$/24 hrs @ 73° F., 0% RH | 135 | 320 | 304 | NA |

The results demonstrate improved mechanical properties with the polymeric compositions containing the SBS block copolymers. It was observed that polymeric compositions containing FINAPRENE 602D and FINACLEAR 520 reduced the film stiffness, as evinced by a decrease in the 2% secant modulus, (20% to 36% for the MD and 45% to 65% for the transverse direction (TD) compared to the base resin comprising pure 4180 polypropylene resin. Specifically, the 2% secant modulus in the MD for the base resin is reduced from 700 MPa to 440 MPa with the inclusion of 15% FINAPRENE 602D. Furthermore, the 4180 polypropylene resin with the SBS softening additive was observed to contain less wrinkles than the polymeric composition without the SBS softening additive.

Improvements in the impact strength and barrier properties were also observed for all polymeric compositions when compared to the base resin. Specifically, both the OTR and WVTR were increased in the polymeric compositions having the FINAPRENE 602D and FINACLEAR 520 modifiers. This improvement in barrier properties may be attributed to the higher styrene content of the SBS modifier making the films more "breathable."

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymeric composition having a MIR determined by ASTM D 1238 condition L of less than 2 g/10 min. comprising an impact copolymer and a softening agent, wherein said impact copolymer comprises a polypropylene homopolymer component and an ethylene-propylene rubber component and said impact copolymer has an ethylene content of from 10 wt. % to 15 wt. %, which when said polymeric composition is formed into a film has an oxygen transmission rate of equal to or greater than 300 cc/100 in$^2$/24 h at 73° F. and 0% relative humidity per ASTM D 3895, a water vapor transmission rate of equal to or greater than 0.5g/100 in$^2$/24 hrs at 100° F. and 100% relative humidity per ASTM F 1249, a haze from 0% to 85%, and a gloss at 45° of from 5% to 70%.

2. The composition of claim 1 wherein the polypropylene homopolymer phase comprises up to 5 wt. % of another $C_2$-$C_8$ alpha olefin.

3. The composition of claim 1 including a softening agent formed from a rubber, a thermoplastic elastomer or combinations thereof.

4. The composition of claim 3 wherein the thermoplastic elastomer is a styrene butadiene block copolymer.

5. The composition of claim 4 wherein the styrene butadiene block copolymer is present in an amount of from 5 wt. % to 50 wt.%.

6. The composition of claim 4 wherein the styrene butadiene block copolymer has a styrenic content equal to or greater than 70 wt. %.

7. An article comprised of the polymeric composition of claim 1.

8. The article of claim 7 having a 2% secant modulus in the MD of from 300 MPa to 700 MPa.

9. The article of claim 7 is a film.

10. The article of claim 9 wherein the film is formed by a blown film extrusion process.

11. The article of claim 10 wherein the blown film extrusion process has a blow up ratio of greater than 4.

12. The article of claim 10 wherein the blown film extrusion process has a die temperature of greater than 440° F.

13. The article of claim 10 wherein the blown film extrusion process has an extruder temperature of greater than 440° F.

14. The article of claim 10 wherein the blown film extrusion process has a draw clown ratio of less than 15.

15. The article of claim 9 wherein the film has a haze of less than 10%.

16. The article of claim 9 wherein the film has a dart drop strength of from 200 g to 500 g.

17. The article of claim 9 wherein the film has an Elmendorf tear strength in the MD of from 50 g to 400 g.

18. The article of claim 9 wherein the film has a monolayer thickness of from 0.5 mils to 2.5 mils.

19. A polymeric film comprising an impact copolymer and a softening agent, wherein said impact copolymer comprises a polypropylene homopolymer component and an ethylene-propylene rubber component and said impact copolymer has an ethylene content of from 10 wt. % to 15 wt. % and an MFR determined by ASTM D 1238 condition L of less than 2g/10 min., and wherein said softening agent comprises a styrene butadiene block copolymer, wherein said film has a 2% secant modulus in the machine direction of 300 MPa to 700 MPa; an oxygen transmission rate of greater than 300 cc/100 in$^2$/24 h at 100° F., a water vapor transmission rate of greater than 0.5 g/100 in$^2$/24 hrs at 100° F. and 100% relative humidity; an Elmendorf tear strength in the MD of from 50 g to 400 g; an Elmendorf tear strength in the transverse direction of from 150 g to 400 g, a dart drop strength of from 200 g to about 500 g, a haze of from 0% to 85% and, gloss at 45° of from 5% to 70%.

20. A biaxially oriented polypropylene film, wherein said biaxially oriented polypropylene film is formed from a polymeric composition comprising an impact copolymer and a softening agent, wherein said impact copolymer comprises a polypropylene homopolymer component and an ethylene-propylene rubber component and said impact copolymer has an ethylene content of from 10 wt. % to 15 wt. % and an MFR determined by ASTM D 1238 condition L of less than 2 g/10 min., and wherein said softening agent comprises a styrene butadiene block copolymer, which when formed into a 2 mils thick blown film, has an oxygen transmission rate of equal to or greater than 300 cc/100 in$^2$/24 h at 73° F.

* * * * *